United States Patent
Yun et al.

(10) Patent No.: US 9,610,557 B2
(45) Date of Patent: Apr. 4, 2017

(54) NON-MELT AND PARTIAL MELT TYPE ENTRAINED FLOW BED GASIFIER

(71) Applicant: INSTITUTE FOR ADVANCED ENGINEERING, Seoul (KR)

(72) Inventors: Yongseung Yun, Jung-gu (KR); Jin Wook Lee, Jung-gu (KR); Seung Jong Lee, Jung-gu (KR); Seok Woo Chung, Jung-gu (KR); Dae Sung Kim, Jung-gu (KR)

(73) Assignees: Institute For Advanced Engineering, Seoul (KR); Korea Western Power Co., Ltd., Seoul (KR)

( * ) Notice: Subject to any disclaimer, the term of this patent is extended or adjusted under 35 U.S.C. 154(b) by 161 days.

(21) Appl. No.: 14/343,113

(22) PCT Filed: Apr. 26, 2013

(86) PCT No.: PCT/KR2013/003598
§ 371 (c)(1),
(2) Date: Mar. 6, 2014

(87) PCT Pub. No.: WO2013/165122
PCT Pub. Date: Nov. 7, 2013

(65) Prior Publication Data
US 2014/0227142 A1    Aug. 14, 2014

(30) Foreign Application Priority Data
May 4, 2012    (KR) .................. 10-2012-0047535

(51) Int. Cl.
*B01J 8/02* (2006.01)
*F23R 3/28* (2006.01)
(Continued)

(52) U.S. Cl.
CPC ............... *B01J 8/245* (2013.01); *C10J 3/485* (2013.01); *C10J 3/506* (2013.01); *F23D 1/00* (2013.01);
(Continued)

(58) Field of Classification Search
CPC combination set(s) only.
See application file for complete search history.

(56) References Cited

U.S. PATENT DOCUMENTS 2,616,257 A * 11/1952 Mock ................. F23R 3/10
                                                  116/DIG. 22
4,351,647 A *  9/1982 Marion .............. C01B 3/363
                                                  252/373
(Continued)

FOREIGN PATENT DOCUMENTS

CN    1125163 A    6/1996
CN    1804003 A    7/2006
(Continued)

OTHER PUBLICATIONS

International Search Report for PCT/KR2013/003598 mailed on Feb. 28, 2013 and its English Translation.
(Continued)

*Primary Examiner* — Kaity Handal
(74) *Attorney, Agent, or Firm* — Ladas & Parry, LLP (57) ABSTRACT

The present invention relates to a cylindrical non-melt and partial melt type entrained flow bed gasifier with one or more burners mounted on the top thereof for supplying pulverized raw coal and oxidizer thereto, wherein each of the burners comprises three or four pipes so as to form a central supplying line for injecting the pulverized coal with a carrier gas into the gasifier, a primary oxidizer annular region around the central supplying line having a plurality of primary oxidizer supplying bores for injecting primary oxi-
(Continued)

dizer vertically or at an angle to the injection region of the pulverized coal supplied through the central supplying line so as to direct the pulverized coal to the central region, and an outer cooling annular region around the primary oxidizer annular region for flowing cooling water, which is operated preferably at a temperature range of 1,250~1,450° C., or of 1,150~1,500° C. according to the properties of the coal. According to the present invention, the pulverized coal and oxidizer are properly mixed, and the pulverized coal is directed towards the middle of the gasifier, so that the reaction is completed with the ash being wholly non-melted or partially melted.

7 Claims, 10 Drawing Sheets (51) Int. Cl.
*B01J 8/24* (2006.01)
*C10J 3/48* (2006.01)
*C10J 3/50* (2006.01)
*F23D 1/00* (2006.01)

(52) U.S. Cl.
CPC .. *C10J 2300/093* (2013.01); *C10J 2300/1653* (2013.01); *C10J 2300/1665* (2013.01); *F23C 2900/06043* (2013.01); *F23D 2201/10* (2013.01); *F23D 2214/00* (2013.01); *Y02E 20/18* (2013.01)

(56) References Cited

U.S. PATENT DOCUMENTS

| | | | |
|---|---|---|---|
| 4,402,740 A * | 9/1983 | Arp | C22B 15/0032 266/900 |
| 4,491,456 A * | 1/1985 | Schlinger | 48/197 R |
| 4,887,800 A | 12/1989 | Hotta et al. | |
| 7,784,282 B2 * | 8/2010 | Masso | F23D 11/36 239/124 |
| 2008/0044782 A1 * | 2/2008 | Kostlin | F02C 7/26 431/284 |
| 2010/0136378 A1 * | 6/2010 | Lee | C01B 3/34 429/423 |
| 2010/0186417 A1 * | 7/2010 | Blomeyer | F23D 11/36 60/772 |
| 2012/0192568 A1 * | 8/2012 | Miura | F23R 3/286 60/776 |
| 2012/0266538 A1 | 10/2012 | Lee | |
| 2013/0219899 A1 * | 8/2013 | Uhm | F23R 3/14 60/738 |

FOREIGN PATENT DOCUMENTS

| | | |
|---|---|---|
| CN | 101024781 A | 8/2007 |
| CN | 101985568 A | 3/2011 |
| CN | 102166549 A | 8/2011 |
| CN | 102287826 A | 12/2011 |
| EP | 0 108 503 | 5/1984 |
| GB | 1450190 * | 11/1973 |
| JP | H08-283750 | 10/1996 |
| JP | 2002-249786 | 9/2002 |
| JP | 2003-193068 | 7/2003 |
| KR | 10-2010-0048212 | 5/2010 |
| KR | 10-2011-0065962 | 6/2011 |
| WO | 2011/071339 | 6/2011 |
| WO | 2012/041808 | 4/2012 |

OTHER PUBLICATIONS

Office Action dated Dec. 31, 2014 for Chinese Patent Application No. 201380003241.5.
Office Action dated Jul. 28, 2015 for Australian Patent Application No. 2013255212.
Extended European Search Report dated Dec. 4, 2015 for European Patent Application No. 13785041.8.

* cited by examiner

NON-MELT AND PARTIAL MELT TYPE ENTRAINED FLOW BED GASIFIER

CROSS-REFERENCE TO RELATED APPLICATIONS

This application is the U.S. National Stage of International Patent Application No. PCT/KR2013/003598 filed on Apr. 26, 2013, which claims priority to Korean Patent Application No. 10-2012-0047535 filed on May 4, 2012, the disclosures of which are hereby incorporated by reference in their entireties.

TECHNICAL FIELD

The present invention relates to a non-melt and partial melt type entrained-bed gasifier, and more particularly to a non-melt and partial melt type entrained-bed gasifier, which is used to produce syngas containing carbon monoxide (CO) and hydrogen ($H_2$) as main components by supplying coal or a low-grade hydrocarbon raw material such as heavy residual oil through a burner disposed at the top of the gasifier and allowing the supplied raw material to react with an oxidizer supplied separately from the supplied raw material so as to gasify the supplied raw material.

BACKGROUND ART

As is well known in the art, gasification technology is a clean energy production technology of producing syngas by gasifying coal, biomass or low-grade hydrocarbon fractions such as heavy residual oil. The produced syngas is used in IGCC (Integrated Gasification Combined Cycle), for the production of chemical materials such as methanol or DME (dimethyl ether), synthetic petroleum and synthetic natural gas, or the like.

Typical examples of conventional coal gasifiers include slagging gasifiers that are operated at a temperature of 1,400° C. or higher, and fluidized-bed or fixed-bed gasifiers that are operated in a non-slagging mode.

Organic substances such as coal or heavy residual oil can be converted into syngas at a temperature 1,300° C., whereas slagging gasifiers are operated in the temperature range from 1,400 to 1,600° C. in order to melt ash. Unlike these gasifiers, fluidized-bed or fixed-bed gasifiers are operated at a temperature of 1,000° C. or below, which is lower than the slagging temperature of ash, in order to avoid the adhesion of ash upon slagging.

Most gasification technologies designed to gasify solid particle materials such as coal, or ash-containing liquid materials such as heavy residual oil, to produce clean energy, are based on entrained-bed gasification technology in which pulverized coal particles having a very small size are entrained into a stream of an oxidizer (oxygen or a mixed gas of oxygen and steam) to promote gasification reactions.

In most gasification technologies, as a relatively large amount of an oxidizer is supplied, the operating temperature of the gasifier is as high as 1,400 to 1,600° C., and the gasification reaction is performed in this high-temperature atmosphere. Thus, there is an advantage in that the time required for the reaction is short.

In addition, entrained-bed gasification technology uses a technology of slagging ash in this high-temperature atmosphere to form slag.

Thus, entrained-bed gasification technology has an advantage in that the conversion rate of carbon is high, because the carbon of pulverized coal is mostly converted into a gaseous state in a process in which most pulverized coal flows along the inner wall of the gasifier in a molten state.

On the other hand, in the case of such entrained-bed gasifiers, a reactor manufactured by lining a thick refractory material on the inner wall of a pressure vessel in order to protect the gasifier from high-temperature molten slag is frequently used.

Because the high-temperature molten ash slag flows along the wall surface of the gasifier, the refractory material is damaged by corrosion within a relatively short time. Further, syngas, which results in the gasification reaction of raw material and contains carbon monoxide (CO) and hydrogen ($H_2$) as main components, also contains sulfur-containing gas such as corrosive hydrogen sulfide ($H_2S$), which increases the corrosive property of the high-temperature syngas to significantly shorten the life span of the refractory material.

Indeed, in the case of many commercial gasification plants, the life span of the refractory material is short, and thus significant cost and time are required in a process of replacing the refractory material with fresh refractory material, thus reducing the availability of commercial plants.

As a result, due to the short life span of the refractory, in an integrated gasification combined cycle (IGCC) system in which pulverized coal is gasified to operate a combined power plant, the number of annual operating days is reduced, thus causing problems in terms of economy. In addition, in a plant in which synthetic petroleum or chemical materials are produced using syngas produced by gasification of pulverized coal, the annual production of products is reduced, thus causing problems in terms of economy.

Technologies contrary to such slagging-type gasifiers include non-slagging type gasification technologies, and typical examples of the non-slagging type gasification technologies include fluidized-bed gasification technologies.

In all the fluidized-bed gasification technologies, a solid fluid medium (usually sand or coal ash) is additionally supplied so that an oxidizer and crushed coal particles are brought into direct contact and mixed with the solid fluid medium in the reactor to promote the gasification reaction.

However, in such fluidized-bed gasification technology, the fluid medium should not melt, and for this reason, the oxidizer is supplied in a relatively small amount compared to that in the case of the entrained-bed gasifier, and thus the operating temperature of the fluidized-bed gasifier is generally about 950° C. or lower and does not exceed 1000° C. Thus, the fluidized-bed gasification technology has an advantage in that the life span of the refractory material is long.

However, fluidized-bed gasification technology has disadvantages in that the gasification reaction is time-consuming due to the low operating temperature compared to that in entrained-bed gasification technology and in that the conversion rate of carbon is low compared to that in entrained-bed gasification technology.

In addition, it has disadvantages in that the size of the reactor is required to be increased in order to compensate for the low operating temperature, and as the size of the reactor increases, the area of the outer wall of the reactor, which comes into contact with the atmosphere, also increases, resulting in an increase in heat loss. Furthermore, due to the relatively low operating temperature, the raw material is not completely converted into syngas, and some amount of liquid tar is produced to cause operation failure or reduce yield.

In some cases, fouling occurs to cause operation failure.

Regarding the background of the present invention, for example, Korean Patent Registration No. 10-1096632 (published on Dec. 21, 2011) discloses a top-feeding dual-swirling gasifier comprising: a feed line through which pulverized coal is fed by nitrogen; a distributor configured to divide pulverized coal being fed; a plurality of burner nozzles configured to feed the pulverized coal divided in the distributor and an oxidizer; a pressure reactor configured to react pulverized coal with the oxidizer to produce syngas containing carbon monoxide (CO) and hydrogen ($H_2$) as main components; a swirl generator configured to impart a swirling force to the oxidizer that is fed into the pressure reactor; a slag cooling and storing container placed beneath the pressure reactor, wherein each of the burner nozzles for feeding the pulverized coal and the oxidizer consists of a triple tube. The pulverized coal and a carrier gas are supplied to the central region, and the oxidizer is supplied to an annular region surrounding the central region.

According to this configuration, as the oxidizer is imparted with a swirling force by the swirl generator in the annular region, the mixing of the raw material pulverized coal and the oxidizer is promoted, thereby achieving rapid completion of the gasification reaction. As a result, the volume of the gasifier is reduced, and slag formed by the slagging and agglomeration of the pulverized coal particles flows along the inner wall of the gasifier due to a centrifugal force created by the swirling flow while it resides in the reactor for a long time, and thus the conversion rate of carbon is increased. Furthermore, the pulverized coal particles can be treated to form a slag byproduct, and thus economy is ensured.

The above patent relates to an entrained-bed gasifier that is operated in a slagging mode. According to the disclosure of the patent, an integral burner unit consisting of a plurality of triple tube type burners is disposed at the top of the gasifier, and a material supply line is disposed in the central region of each burner to inject pulverized coal. Also, a swirl generator is disposed in an annular region surrounding the material supply line to impart a swirling force to a primary oxidizer flowing around the material to thereby form a swirl flow in the gasifier, and cooling water flows to the annular region of each burner to protect the burner from a high-temperature environment. In addition, a secondary oxidizer is supplied to a portion of the circular cross-section area of the top of the gasifier, which excludes the region in which the plurality of burners are disposed, in such a manner that a swirling force can also be imparted to the secondary oxidizer. In addition, as the flow rate of the primary oxidizer and the flow rate of the secondary oxidizer can be separately controlled, the raw material is supplied through the plurality of burners, and a swirling force is imparted to the primary oxidizer supplied from each burner while it is also imparted to the secondary oxidizer flowing through the region surrounding the burners, whereby the flow of the pulverized coal is inclined toward the inner wall of the gasifier, and thus ash present in the pulverized coal can mostly be treated in a molten state, thereby increasing the conversion rate of carbon.

Conventional entrained-bed gasification technologies including the above patent adopt slagging-type technology and have the advantages as described above.

However, although conventional entrained-bed gasification technologies have the advantages as described above, an excellent refractory material that can resist the high-temperature environment of the entrained-bed gasifier for a time of 1 or 2 years or longer does not exist, and a very special material is required, and the price thereof is not suitable for commercial applications. In view of these facts, the gasifier cannot be operated for a long period of time in an environment in which corrosion by molten slag that excessively moves toward the inner wall of the gasifier, in addition to corrosion by syngas, occurs.

In fluidized-bed gasification technology that is conventional technology belonging to another class, the operating temperature of the fluidized-bed gasification technology is about 950° C. or below, at which ash is not melted, and the operating temperature does not exceed 1000° C. For this reason, this technology has an advantage in that the life span of the refractory material is long, and thus long-term operation is possible, whereas it has disadvantages in that, due to this low operating temperature, it requires a large amount of time for the gasification reaction compared to entrained-bed gasification technology, the conversion rate of carbon is lower than that in entrained-bed gasification technology, and the size of the reactor is required to be increased.

In addition, due to the low operating temperature, some amount of liquid tar is produced to cause operation failure or reduce the yield, and in some cases, fouling occurs to cause operation failure.

DISCLOSURE

Technical Problem

Accordingly, the present invention has been made in order to solve the above-described problems occurring in the prior art, and an object of the present invention is to provide a non-melt and partial melt-type entrained-bed gasifier, in which oxygen is supplied in an amount larger than that in a non-melt gasifier to which a small amount of an oxidizer is supplied, but in an amount smaller than that in a melt-type gasifier to which an oxidizer is supplied in an amount much larger than that in the non-melt gasifier, whereby the gasifier can be operated in a state in which ash is not molten or is partially molten, at a temperature of 1,250~1,450° C., which is intermediate between the operating temperatures of the two types of gasifiers, and thus most organic materials can be converted into a gaseous state, and the gasifier can be operated in a state in which ash is not molten or is partially molten, in the temperature range of 1,150~1,500° C. depending on the reactivity according to various properties of coal and the fluidization temperature of ash, and thus the gasifier is not exposed to a high temperature of 1,500° C. or above, and thus the durability of the material of the gasifier can be increased and the manufacture cost of the gasifier can be reduced.

Another object of the present invention is to provide a non-melt and partial melt-type entrained-bed gasifier, which is in the form of an entrained bed having high reaction rate, and enables unconverted carbon-containing ash to be recycled, if required, to obtain a high conversion rate of carbon, and enables generated ash to be used as a recycled material instead of being recycled to the gasification process.

Technical Solution

In order to accomplish the above objects, in one aspect, the present invention provides a non-melt and partial melt type entrained-bed cylindrical gasifier to which pulverized coal as a raw material and an oxidizer are supplied through one or more burners disposed at the top of the gasifier, wherein each of the burners is composed of a triple tube and comprises: a raw material supply line that is the most central region through which the pulverized coal is injected into the gasifier by a carrier gas; a primary oxidizer region that is an annular region provided around the raw material supply line and having formed therein a plurality of primary oxidizer supply holes through which a primary oxidizer is injected perpendicularly or at an angle with respect to a region into which the pulverized coal is supplied through the raw material supply line, so that the pulverized coal is directed toward the central region; and a cooling water region which is the outermost annular region provided around the primary oxidizer region and through which cooling water is introduced into the gasifier and discharged from the gasifier, the gasifier preferably being operated in the temperature region from 1,250 to 1,450° C. or in the temperature range from 1,150 to 1,500° C. depending on the properties of the pulverized coal.

In the present invention, each of the burners may be composed of a quadruple tube and may further comprise a secondary oxidizer region that is an annular region provided around the primary oxidizer region having formed therein a plurality of secondary oxidizer supply holes through which a secondary oxidizer is injected perpendicularly or at an angle with respect to a region into which the pulverized coal is supplied through the raw material supply line, so that the pulverized coal is directed toward the central region.

The oxidizer may be injected at an angle of about −20° to +20° toward the region into which the pulverized coal is injected, so that the degree of mixing of the pulverized coal and the oxidizer is capable of being controlled.

In view of the degree of reactivity of the pulverized coal and the movement direction of the pulverized coal particles, the primary oxidizer may be supplied in an amount of 50-100% based on the total amount of oxidizers supplied, and the secondary oxidizer may be supplied in an amount of 0-50% based on the total amount of oxidizers supplied.

The reaction region of the gasifier has an aspect ratio (L/D) of 5-10, wherein L and D are the length and diameter of the reaction region, respectively.

When the pulverized coal is high-rank coal having poor reactivity, the oxidizer is injected at an angle of 0° to +20° and consists mostly of the primary oxidizer, and when the pulverized coal is low-rank coal having good reactivity, the oxidizer is injected at an angle of −20° to 0° and consists of the primary oxidizer and the secondary oxidizer, and the ratio between the primary oxidizer and the secondary oxidizer, which are injected, is controlled such that the gasification of the pulverized coal occurs relatively slowly compared to when only the primary oxidizer is supplied.

Preferably, the number of the secondary oxidizer supply holes is 2-3 times larger than that of the primary oxidizer supply holes, and the diameter of the secondary oxidizer supply holes is ½-⅓ of that of the primary oxidizer supply holes.

Advantageous Effects

According to the present invention, pulverized coal and an oxidizer are suitably mixed with each other while the path of pulverized coal particles is directed to the center of the gasifier. Thus, all ash is completely gasified while maintaining a non-molten state or a partial molten state.

BEST MODE

Hereinafter, the present invention will be described in detail with reference to the accompanying drawings. Further, in the following description, a detailed description of known functions and configurations incorporated herein will be omitted when it may obscure the subject matter of the present invention.

Figure 1:
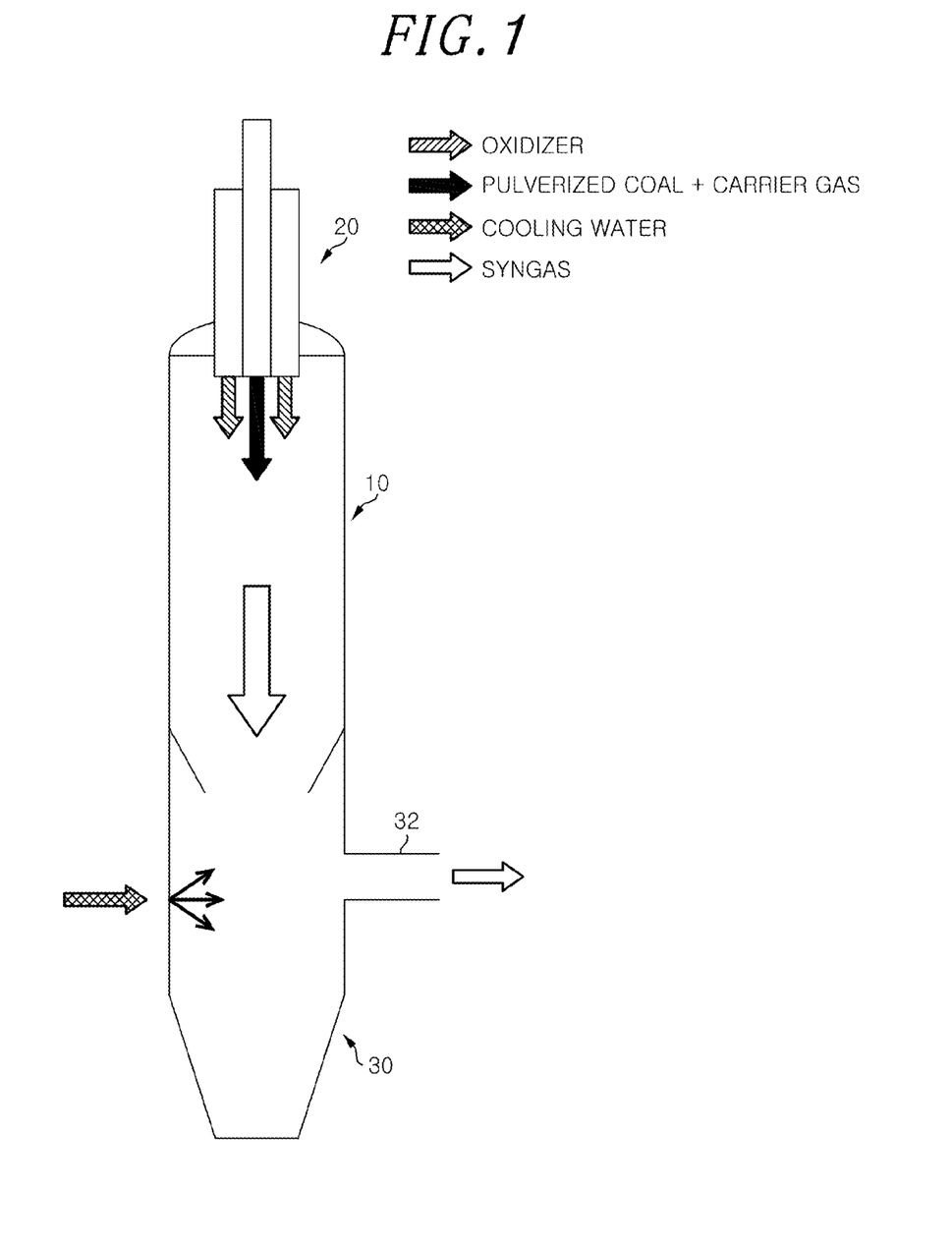
FIG. 1 is a schematic view showing the configuration of a non-melt and partial melt-type entrained-bed gasifier according to an embodiment of the present invention.
Figure 2:
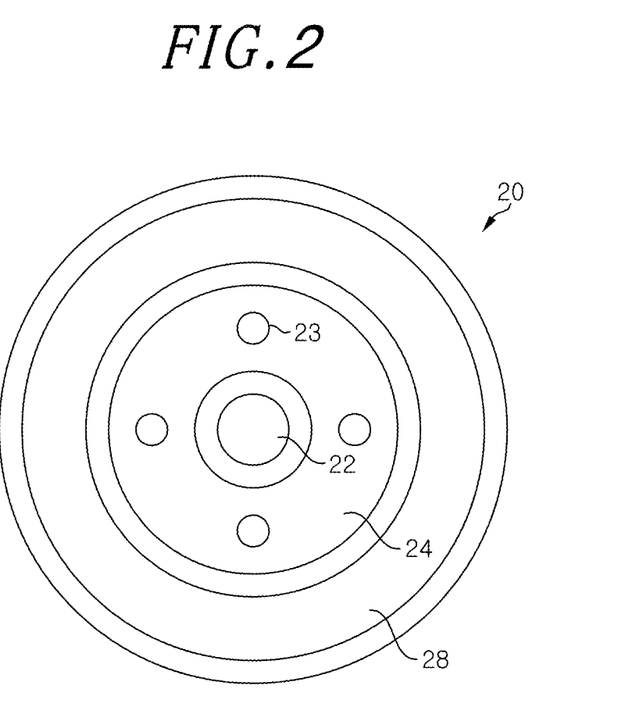
FIG. 2 shows an example of the gasifier of FIG. 1 and is a conceptual view showing the horizontal cross section of a triple tube-type burner through which pulverized coal and an oxidizer are supplied.
Figure 3:
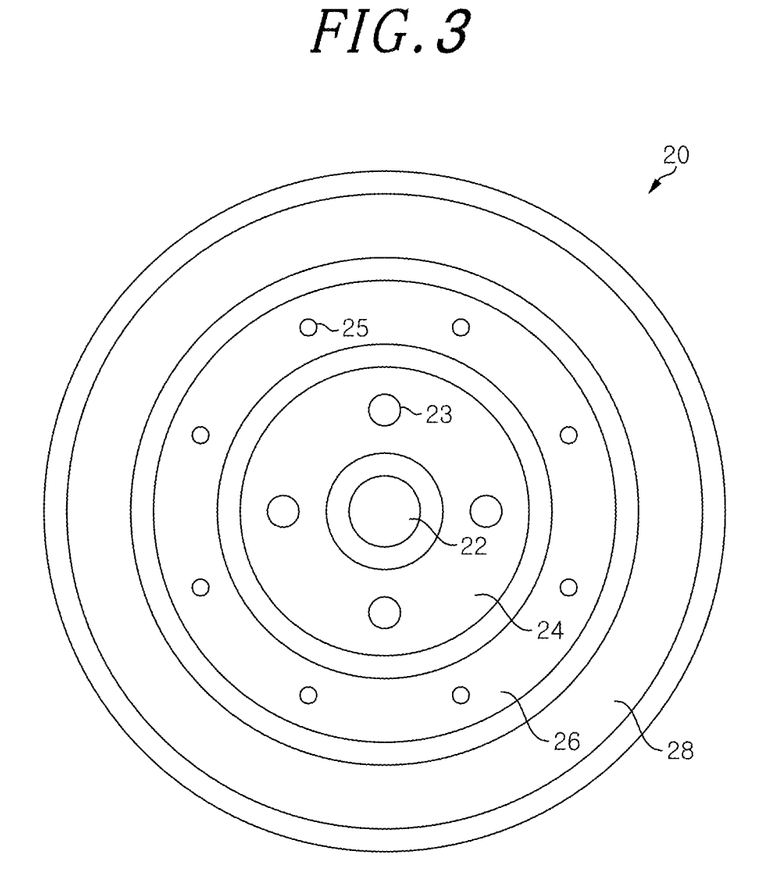
FIG. 3 shows another example of the gasifier of FIG. 1 and is a conceptual view showing the horizontal cross-section of a quadruple tube-type burner through which pulverized coal and an oxidizer are supplied.
Figure 4A:
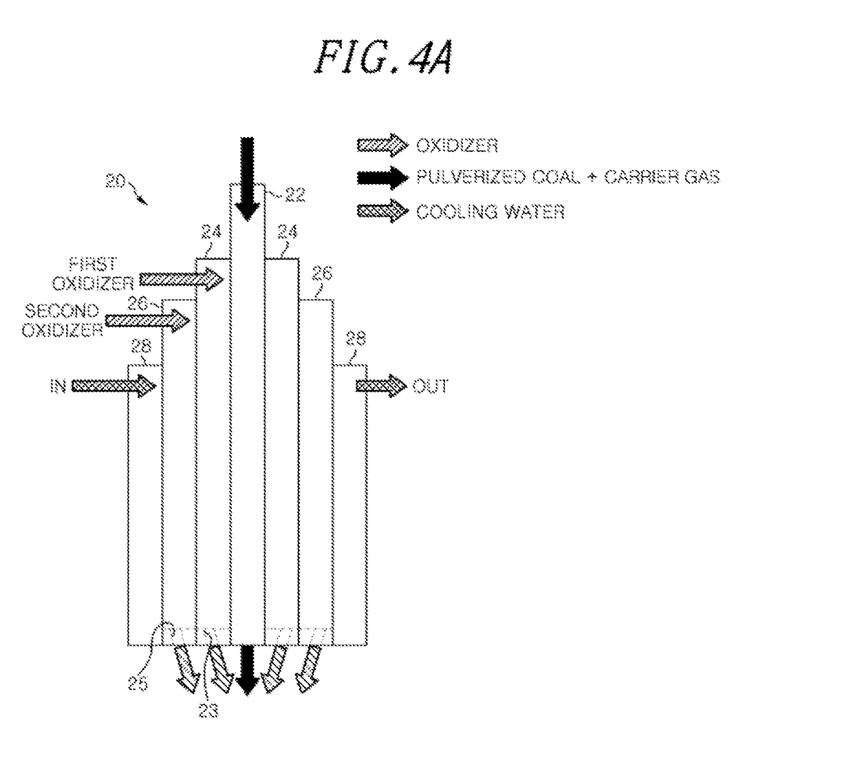
FIG. 4 is a conceptual view showing the vertical cross-section of the burner shown in FIG. 3 and shows the directions in which the primary oxidizer and the secondary oxidizer are supplied.
Figure 4B:
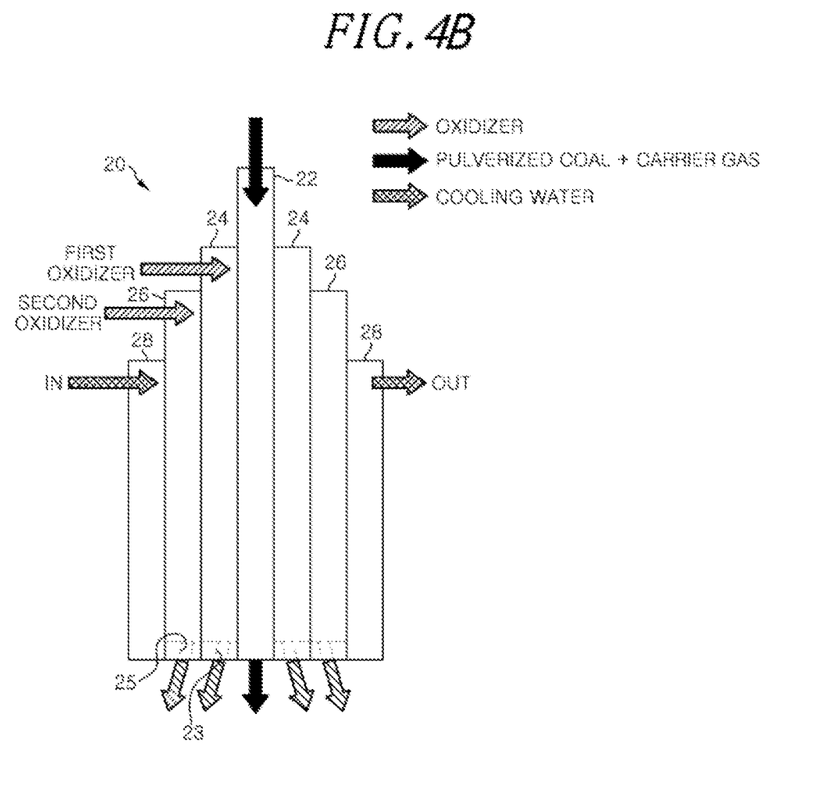

FIG. 1 is a schematic view showing the configuration of a non-slagging and partial slagging-type entrained-bed gasifier according to an embodiment of the present invention; FIG. 2 shows an example of the gasifier of FIG. 1 and is a conceptual view showing the horizontal cross section of a triple tube-type burner through which pulverized coal and an oxidizer are supplied; FIG. 3 shows another example of the gasifier of FIG. 1 and is a conceptual view showing the horizontal cross-section of a quadruple tube-type burner through which pulverized coal and an oxidizer are supplied; and FIG. 4 is a conceptual view showing the vertical cross-section of the burner shown in FIG. 3 and shows the directions in which the primary oxidizer and the secondary oxidizer are supplied. In FIGS. 2 and 3, the shapes of the tripe-type burner and the quadruple-type burner are shown in detail, including the thickness of nozzle, and when the burner is a triple tube-type burner, a secondary oxidizer region can be excluded from FIG. 4.

As shown in FIG. 1, a non-slagging and partial slagging type entrained-bed gasifier according to the present invention is a cylindrical gasifier 10, at the top of which one or more burners 20 are provided integrally, and to the bottom of which a quenching vessel 30 is connected. Each of the burners 20 may comprise a triple or quadruple tube, and pulverized coal as a raw material and an oxidizer are supplied through the burner 20. At the quenching vessel 30, a syngas discharge tube 32 for discharging syngas from the quenching vessel 30 is attached, and into the lower portion of the quenching vessel 30, cooling water is introduced and discharged.

As shown in FIGS. 2 to 4, when each burner 20 is a triple tube, it comprises a raw material supply line 22 in the most central region, a primary oxidizer region 24 that is an annular region surrounding the raw material supply line 22, and a cooling water region 28 provided in the outermost annular region and serving to provide a pathway for cooling water. When each burner 20 is a quadruple tube, it further comprises an annular region around the primary oxidizer region 24, that is, a secondary oxidizer region 26 between the primary oxidizer region 24 and the cooling water region 28.

In the primary and secondary oxidizer regions 24 and 26, a plurality of supply holes 23 and 25 are formed at a constant distance. When the quadruple tube burner 20 is adopted, places where the supply holes 25 for supplying the secondary oxidizer are formed are located outside places where the supply holes 23 for supplying the primary oxidizer are formed, and thus the number of the secondary oxidizer supply holes 25 is preferably larger than that of the primary oxidizer supply holes 23. Particularly, the number of the secondary oxidizer supply holes 25 is about 2-3 times larger than that of the primary oxidizer supply holes 23.

As described above, the amount of the secondary oxidizer is smaller than that of the primary oxidizer, whereas the number of the secondary oxidizer supply holes 25 is larger. Thus, in order to maintain the supply rates of the primary oxidizer and the secondary oxidizer at similar levels, the diameter of the secondary oxidizer supply holes 25 is preferably smaller than that of the primary oxidizer supply holes 23. Particularly, the diameter of the secondary oxidizer supply holes 25 is about ½ to ⅓ of the diameter of the primary oxidizer supply holes 23.

The raw material pulverized coal is injected into the gasifier 10 through the raw material supply line 22 by means of a carrier gas of nitrogen or carbon dioxide and mixed and reacted with either the primary oxidizer that is supplied through the supply holes 23 in the case of the triple tube burner or the primary and secondary oxidizers that are supplied through the plurality of supply holes 23 and 25 formed in the primary and secondary oxidizer regions 24 and 26 in the case of the quadruple tube burner, thereby producing syngas containing carbon monoxide (CO) and hydrogen ($H_2$) as main components. The produced syngas moves downward.

Cooling water is circulated through the cooling water region 28 forming the outermost region of each burner 20 consisting of a triple or quadruple tube, to prevent the pulverized coal and oxidizer supply regions from being heated by the high-temperature environment.

As described above, according to the present invention, the primary and secondary oxidizers that are supplied downward vertically through the plurality of supply holes 23 and 25 formed in the annular regions surrounding the central nozzle through which the raw material and the carrier gas are supplied are suitably mixed with the pulverized coal to promote the gasification reaction. In addition, the primary and secondary oxidizers supplied induce the pulverized coal to move to the central region of the gasifier 10 so that the pulverized coal does not adhere to the inner wall of the gasifier and ash moves in a non-molten state or a partial molten state.

By this suitable mixing, the reaction of the pulverized coal can be promoted, and thus a carbon conversion rate of about 80-95% or 95% or more can be ensured. At the same time, the inner wall of the gasifier 10 can be protected, and thus the continuity of operation of the gasifier can be ensured so that the availability of the overall gasification plant can be increased, thereby ensuring an economic benefit.

In an embodiment of the present invention, the oxidizer is injected downward. Specifically, depending on the reactivity of pulverized coal, the oxidizer is injected vertically or injected at an angle of about −20° to 20° toward the central region into which the pulverized coal is injected. Thus, while the degree of mixing of the pulverized coal and the oxidizer is controlled, the pulverized coal moves downward along the central region of the gasifier.

Specifically, when the primary oxidizer (100% when the triple burner is used) is injected downward while pulverized coal having poor reactivity is used, the primary oxidizer can be injected at an angle of about 0°-20° toward the central region into which the pulverized coal is injected, thereby promoting the mixing of the pulverized coal and the primary oxidizer.

On the other hand, when coal having good reactivity is used as a raw material, the primary oxidizer can be injected at an angle of about −20° to 0° toward the central region into which the pulverized coal is injected, so that the mixing of the pulverized coal and the oxidizer occurs relatively slowly.

In addition, in view of the degree of reactivity and the movement direction of pulverized coal particles, the amount of primary oxidizer supplied is controlled in the range of 50-100% of the total amount of oxidizer supplied. When high-rank coal having relatively poor reactivity is used as a raw material, the triple tube burner is adopted, and only the primary oxidizer is supplied. Alternatively, if the quadruple burner is adopted, the secondary oxidizer is supplied in an amount of about 20% based on the total amount of oxidizers supplied.

Contrary to the above, when low-rank coal having good reactivity is used as a raw material, particularly when brown coal or subbituminous coal, which has very good reactivity, is used as a raw material, if only the primary oxidizer is supplied, the gasification reaction will occur locally in the upper portion of the gasifier, and thus high temperature will be concentrated on the high portion of the gasifier. To prevent this phenomenon, the quadruple burner can be adopted. In this case, the secondary oxidizer in an amount of about 0-500 based on the total weight of the oxidizers can be supplied through the plurality of supply holes 25 formed in the secondary oxidizer region 26 that is an annular region surrounding the region into which the primary oxidizer is supplied, thereby preventing the gasification reaction from occurring locally in the upper portion of the gasifier around the burner and whereby the gasification reaction can proceed relatively slowly compared to when only the primary oxidizer is supplied, thereby ensuring a uniform temperature distribution throughout the gasifier.

As described above, by selecting the angle of the primary oxidizer, which is injected downward in the same direction as the flow of the pulverized coal, with respect to the flow direction of the pulverized coal, and controlling the amount of each of the primary oxidizer and the second agent, a gasifier can be constructed which can be applied to various kinds of coal that show various degrees of reactivity depending on the water content, ash content and oxygen content thereof.

In addition, when a gasifier is designed such that pulverized coal particles are directed toward the central region, it is possible to embody a non-slagging type gasifier in which ash does not melt or a partial slagging-type gasifier in which ash partially melts.

In coal gasification technology, only oxygen is supplied as an oxidizer, or a combination of oxygen and steam and a combination of oxygen and carbon dioxide is supplied as an oxidizer. In the present invention, because the supply of the primary oxidizer and the supply of the secondary oxidizer are separately controlled, steam or carbon dioxide may be added to the primary oxidizer and the secondary oxidizer at various ratios so as to satisfy the various operating conditions of coal gasification.

In addition, pulverized coal particles mostly move to the central region of the gasifier, and thus the corrosion and erosion rate of the refractory material in the gasifier of the present invention is significantly slower than that of a slagging-type gasifier in which pulverized coal particles flow the inner wall in a molten slag state. Thus, the gasifier of the present invention can be stably operated for a long period of time.

Meanwhile, syngas discharged from the outlet of the gasifier is cooled by quenching water that is injected through the outer wall of a quenching vessel 30 provided beneath the gasifier 10. Herein, the amount of quenching water can be controlled so that the temperature of syngas can be controlled to a temperature suitable for subsequent processes, including a syngas cooling system, a high-temperature fly ash collector and a water gas shift reactor, which can have various configurations depending on the intended use of the plant.

Meanwhile, other methods for treating syngas discharged through the outlet of the gasifier include using a pressure vessel, which is provided beneath the gasifier 10 and have an outer wall made of a refractory material and of which the bottom is filled with sand or ash. Where slag is generated in a small amount, ash can be periodically discharged by a lock hopper system that performs pressure control and discharge using two or more valves provided at the bottom during its operation while storing a small amount of slag and some ash, instead of using the quenching vessel that controls the temperature of syngas by injecting water.

Although gasification technologies known to date mostly use nitrogen as a carrier gas, carbon dioxide may be used instead of nitrogen as a carrier gas in the present invention. To the annular region surrounding the pulverized coal supply region, the primary oxidizer is supplied through a plurality of concentrically arranged supply holes 23 in an amount of 100% based on the total amount of the oxidizers in the case of the triple tube burner and in an amount of about 50-100% based on the total amount of the oxidizers in the case of the quadruple tube burner. When the quadruple tube burner is used, the secondary oxidizer is also supplied in an amount of about 0-50% based on the total amount of the oxidizers through a plurality of concentrically arranged supply holes 25 to a second annular region surrounding the annular region to which the primary oxidizer is supplied.

Meanwhile, in order that the pulverized coal injected into the central region can mostly move to the central region without slanting toward the inner wall of the gasifier 10 while satisfying the retention time required for the gasification reaction, the reaction region of the gasifier has an aspect ratio (L/D) of about 5-10, wherein L and D denote the length and diameter of the reaction region, respectively.

The upper region of the gasifier, which surrounds one or more burners, is made of a refractory material in order to ensure stability. In the case of Korean Patent Registration No. 10-1096632 as described above, the secondary oxidizer is supplied to this large area, and thus no problem arises during a normal operation, but a change in the flow or reaction properties in the gasifier occurs, syngas and the oxidizer can meet each other to cause an intense reaction, thus causing an accident. However, in the present invention, safety can be ensured by providing a refractory material in this region.

Because the amount of pulverized coal particles that move toward the inner wall of the gasifier is small, damage to the inner wall of the gasifier is significantly reduced or eliminated. Thus, the inner wall of the gasifier may be made of various materials, including a thick refractory material, a water wall, or a water wall having a thin refractory material applied thereto. In the case of conventional gasification technologies, pulverized coal particles move toward the inner wall of the gasifier and run against the inner wall, and thus the life span of the refractory material is reduced, or the price of the gasifier is increased due to the use of a water wall made of a high-quality material having high corrosion resistance.

Figure 5:
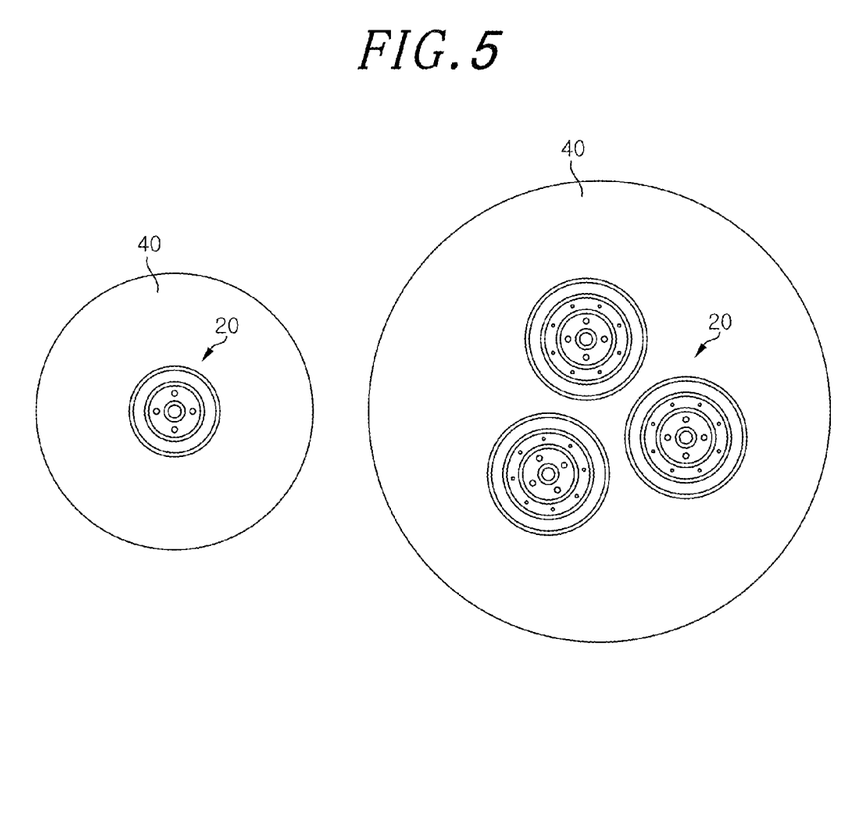
FIG. 5 is a set of horizontal sectional views showing the arrangement of the triple tube-type burner or quadruple tube-type burner of FIG. 2 or 3 and the lining of refractory material in the burner.
Figure 6:
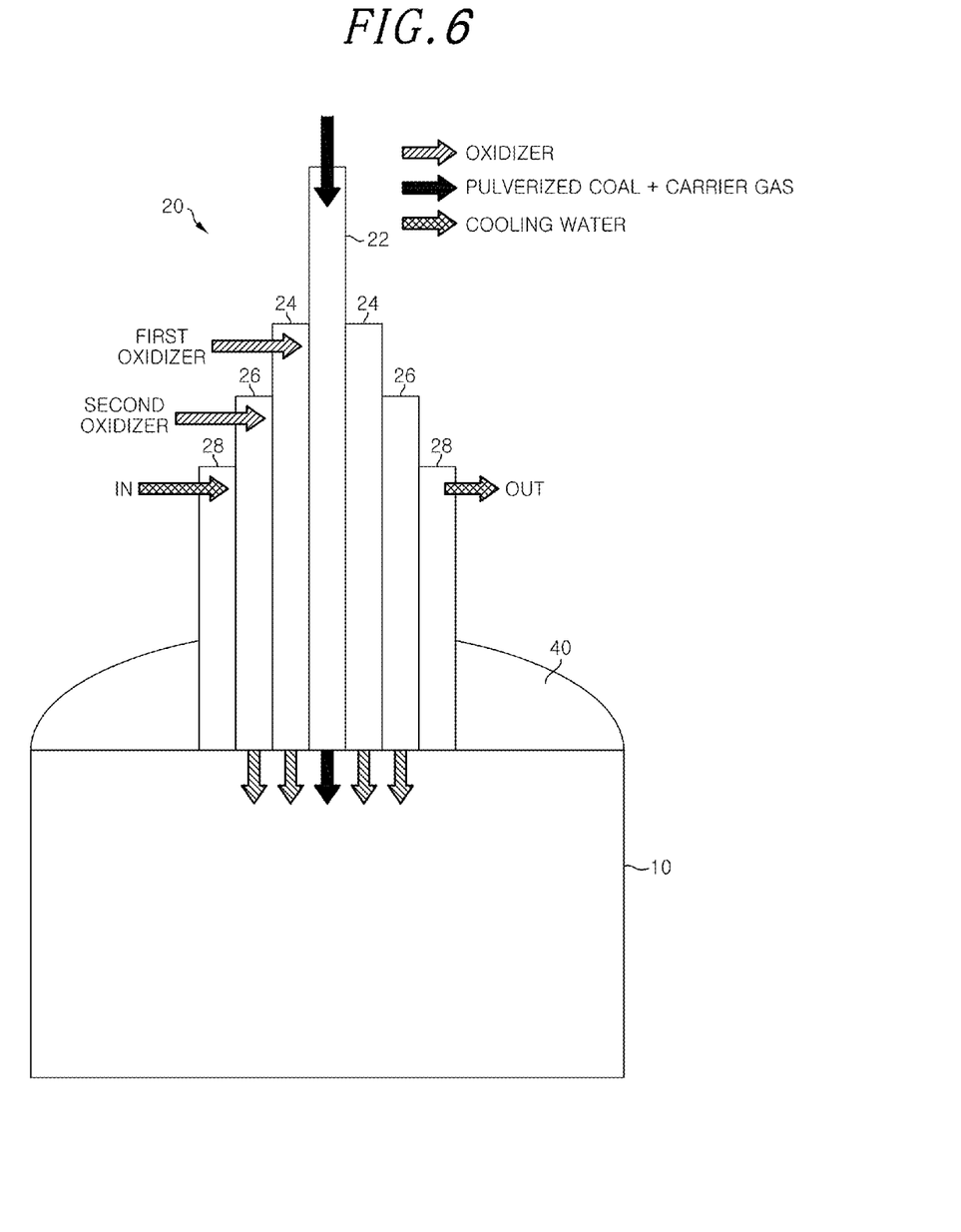
FIG. 6 is a horizontal sectional view showing the arrangement of the triple tube-type burner or quadruple tube-type burner of FIG. 2 or 3 and the lining of refractory material in the burner.

FIG. 5 is a set of horizontal sectional views showing the arrangement of the triple tube-type burner or quadruple tube-type burner of FIG. 2 or 3 and the lining of refractory material in the burner, and FIG. 6 is a horizontal sectional view showing the arrangement of the triple tube-type burner or quadruple tube-type burner of FIG. 2 or 3 and the lining of refractory material in the burner.

In order to embody either a non-slagging type gasifier in which ash is molten or a partial slagging type gasifier in which ash is partially molten, one or more burners 20 are disposed as close as possible to the central region of the gasifier. The number of the burners is selected depending on the capacity for treatment of pulverized coal. If the capacity for treatment of pulverized coal is low, as shown in the left side of FIG. 5, one burner 20 is preferably provided, and if the capacity for treatment of pulverized coal is high, as shown in the right side of FIG. 5, one or more burners 20 are preferably provided.

In addition, in order to maintain each burner 20, provided in the gasifier that is operated for a long period of time, in a safe state, a refractory material 40 is provided around each burner 20.

When pulverized coal is supplied as described above and the primary oxidizer and the secondary oxidizer are supplied at a suitable ratio and angle as described above, the pulverized coal and the oxidizer are mixed and reacted with each other in the gasifier, and most ash is then discharged out of the gasifier in a non-molten state together with syngas.

Although not specifically illustrated in the figures, in this embodiment, the discharged ash is collected in a collector provided downstream of the syngas flow in the outside of the gasifier. Herein, the ash can contain some unreacted fixed carbon, that is, it can still contain energy. In this case, the ash containing unconverted carbon can be used in various applications by a suitable method.

As a method of using ash containing unconverted carbon, a method of supplying the ash again into the gasifier by mixing the ash with pulverized coal that is supplied by a carrier gas can be adopted, thereby ensuring an increased conversion rate of carbon.

If a pulverized coal combustion system is present inside or around the gasification plant, ash may be mixed with pulverized coal and used as an auxiliary fuel, because it is in a dry particle state. If the gasification plant is installed, for example, in places around a coal-producing area, and thus the price of the raw material is very low, ash may also be simply used as a low-grade fuel component without constructing the system that requires additional costs as in the above-described two methods.

Figure 7:
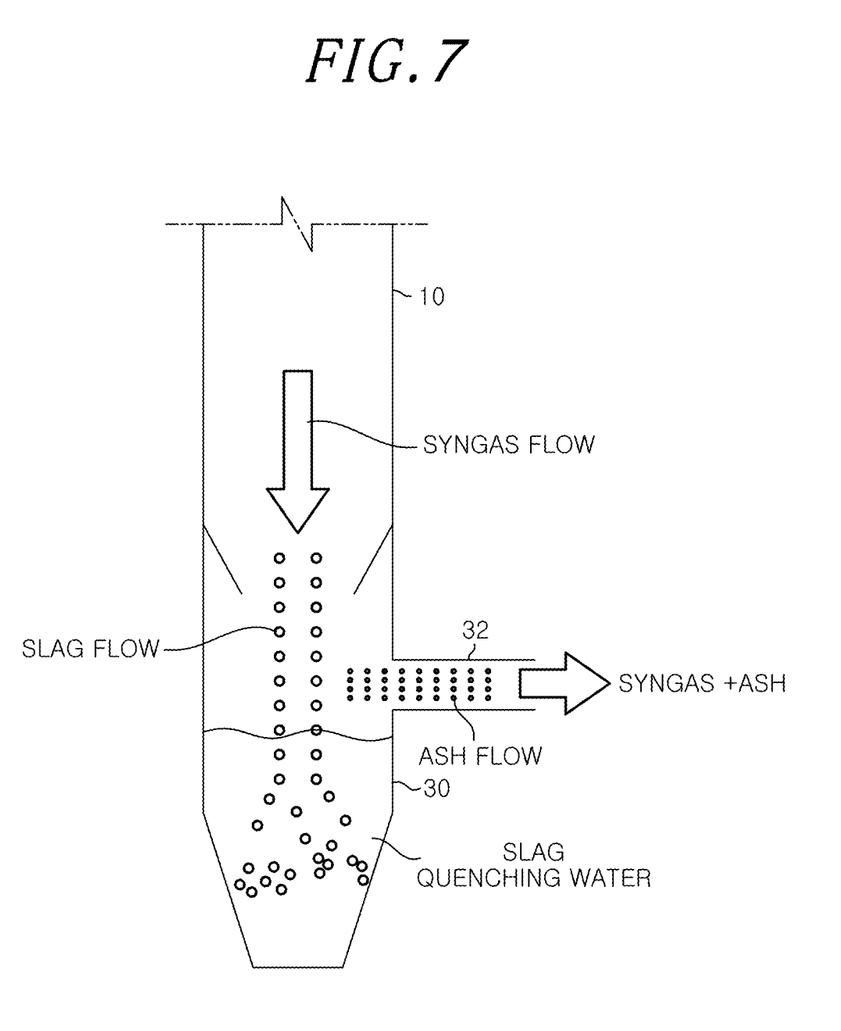
FIG. 7 is a conceptual view showing the flows of syngas, non-molten ash and molten ash in the gasifier of the present invention when a quenching region is provided beneath the gasifier.

FIG. 7 shows the flows of syngas, non-molten ash and molten ash in the gasifier of the present invention.

As shown in FIG. 7, most ash is discharged out of the gasifier 10 in a non-molten state together with syngas, whereas some ash can be molten in a local region having high temperature, and the molten ash particles can agglomerate with each other due to the turbulent flow of syngas to form larger particles.

Figure 8:
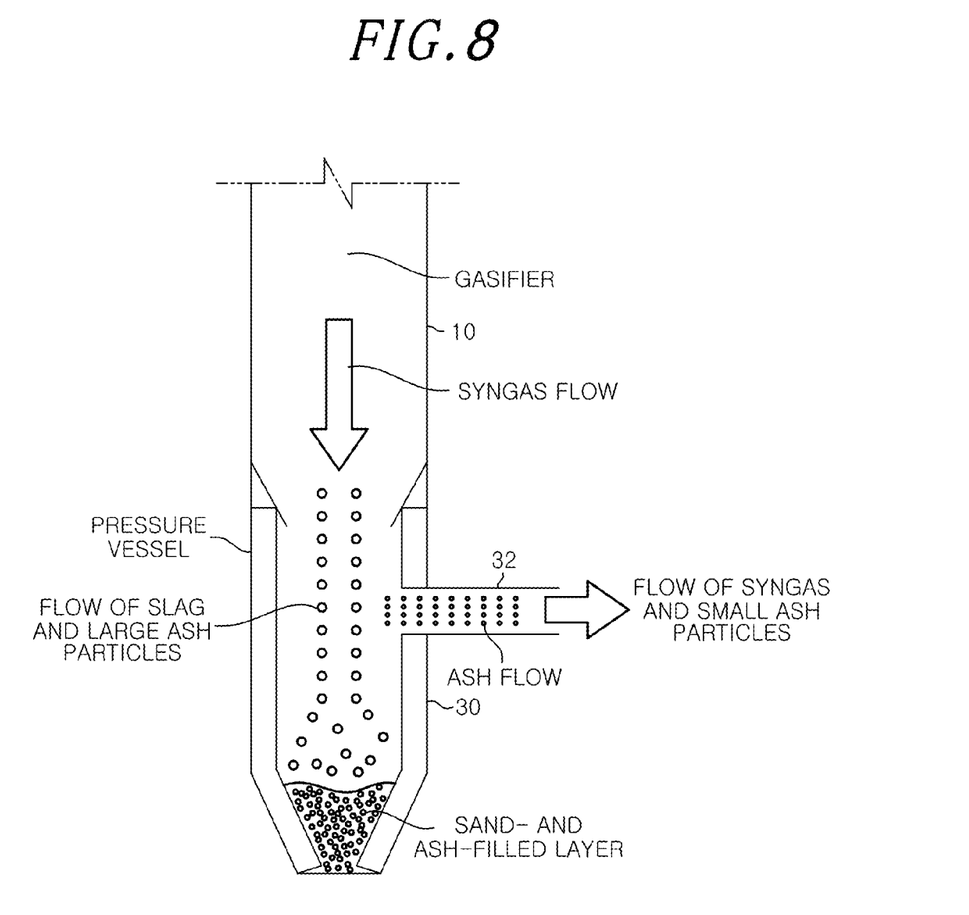
FIG. 8 is a conceptual view showing the flows of syngas, non-molten ash and molten ash in the gasifier of the present invention when a quenching region is provided beneath the gasifier.

Some molten ash having an increased particle size as described above is collected either in a slag cooling and storing vessel, disposed beneath the gasifier 10 and shown in FIG. 7, or in an ash storing vessel shown in FIG. 8, and is periodically discharged to the outside during the operation of the gasifier. As described above, most ash in the gasifier that produces syngas is discharged to the outside in a non-molten state together with syngas, and some ash in a solidified slag or ash state is collected in the storing vessel beneath the gasifier.

When the present invention is applied, the gasifier can be stably operated while most ash is treated in a non-molten state in the gasifier or some ash is treated in a molten state. Particularly, when most ash is treated in a non-molten state, the inner wall of the gasifier can be protected in a very stable manner.

In addition, in the case in which the conversion rate of carbon is low due to the operating temperature that is slightly lower than that of conventional slagging type entrained-bed gasifiers or in which the carbon conversion rate of the gasification plant should be high, a carbon conversion rate sufficient for commercial applications can be ensured by recycling some carbon-containing ash discharged from the gasifier in a non-molten state as mentioned above.

As a result, the problems associated with the decrease in availability of gasification plants due to the long-term repair of refractory material in commercial gasifiers can be solved and the annual operating period of the plants can be significantly increased. In other words, an economic benefit can be ensured by significantly increasing the availability of the plant.

In addition, because the gasifier of the present invention is operated at a temperature lower than those of conventional entrained-bed gasification technologies, a material inexpensive compared to that for conventional entrained-bed gasifiers can be selected, and thus the price of the gasifier can be reduced.

Figure 9:
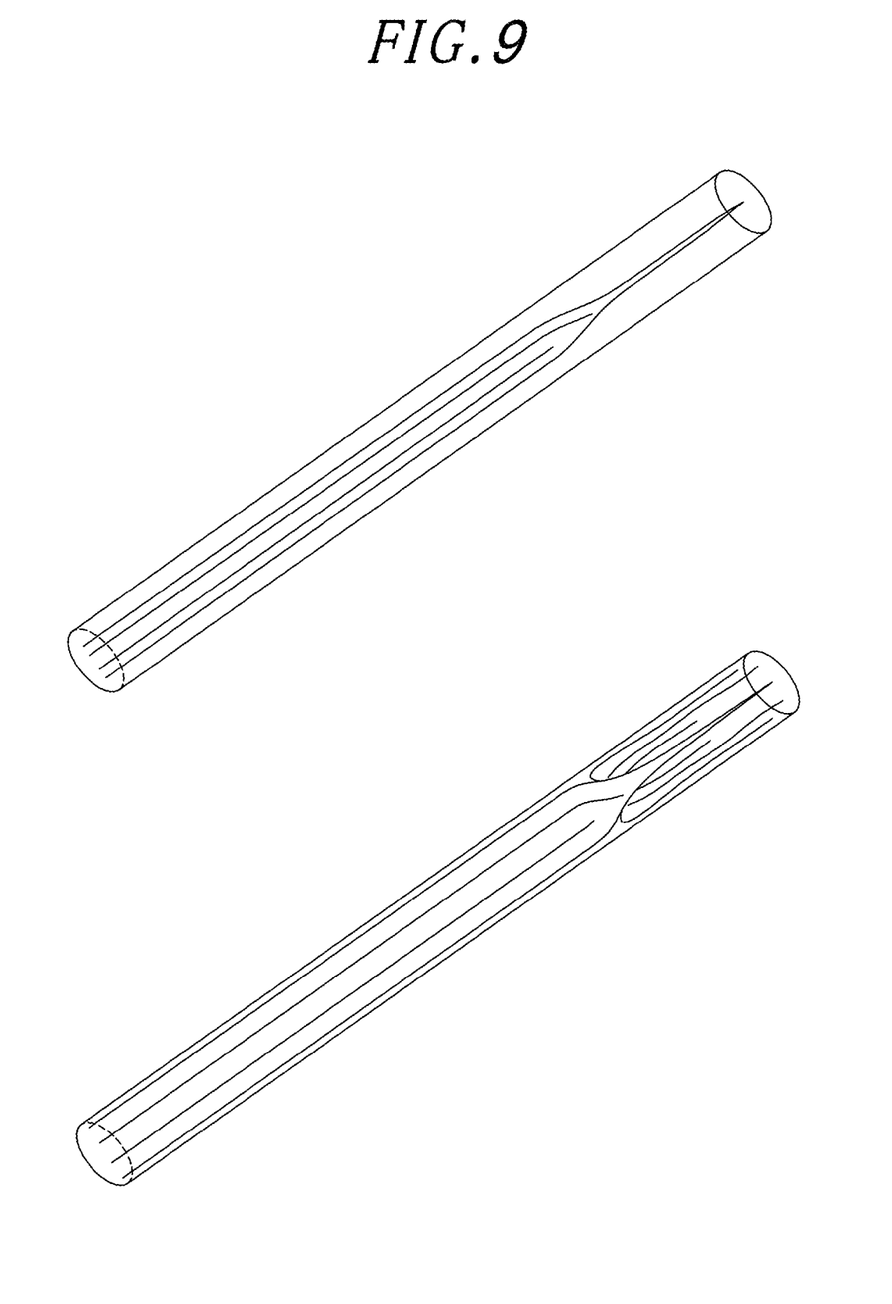
FIG. 9 shows the results of computational analysis of particle tracks in the gasifier of the present invention.

FIG. 9 shows the results of computational analysis of particle tracks in the gasifier of the present invention.

The computational analysis in FIG. 9 was performed using a computational fluid dynamics method in order to confirm whether the refractory material can be stably protected by the technology of the present invention. Also, the computational analysis was performed for the case in which one burner is provided.

The particle track shown in the upper portion of FIG. 9 is the mean track of pulverized coal particles with time, and as can be seen therein, most of the particles are discharged out of the gasifier without slanting toward the outer wall of the gasifier.

However, in an actual natural phenomenon, particles have a tendency to slightly spread due to the turbulent flow of syngas. The results of computational analysis obtained by taking this tendency into consideration are shown in the lower portion of FIG. 9, and as can be seen therein, although some particles are recycled to the upper portion or run against the inner wall of the gasifier, most particles are discharged out of the gasifier without running against the inner wall of the gasifier.

Such computational analysis results indicate that, when the technology of the present invention is applied, the gasifier can be stably operated by treating ash in a non-molten or partially molten state.

As described above, the non-slagging or partial slagging type entrained-bed gasifier of the present invention is an apparatus which has an entrained-bed configuration having high reaction rate and in which unconverted carbon-containing ash can, if necessary, be recycled to obtain a high conversion rate of carbon. Ash generated in the gasifier may be used as a recycled material, rather than being recycled, depending on the properties thereof. Because the gasifier is not exposed to a temperature of 1,500° C. or higher, the durability of the material thereof can be increased and the manufacture cost thereof can be reduced.

In addition, according to the present invention, entrained-bed gasification technology is applied while the mixing of pulverized coal and an oxidizer is suitably controlled and the movement path of pulverized coal is also suitably controlled. The gasifier of the present invention is operated in the temperature range from 1,250 to 1,450° C., which is slightly lower than the operating temperature of conventional slagging type entrained-bed gasifiers and higher than the operating temperature of fluidized-bed gasifiers. Also, the gasifier of the present invention may be operated in the temperature range from 1,150 to 1,500° C. depending on the properties of coal. Thus, the gasifier of the present invention is operated at a temperature slightly lower than the fusion temperature of ash depending on the kind of coal used, so that the ash remains in a non-molten state. Thus, it is a non-slagging or partial slagging type gasifier.

The reasons why this operating temperature cannot be adopted in conventional gasification technologies are that ash fouls the wall of the gasifier and that some ash is molten into slag, which flows along the wall and is solidified at a slightly lower temperature, thereby causing operational failure.

The present invention provides a combined structure of a gasifier and a burner, in which a gasification reaction can occur mainly in the central region of the gasifier such that ash does not adhere to the wall of the gasifier. For this purpose, the reaction region of the gasifier may have a suitable aspect ratio (L/D; L=length of reaction region, and D=diameter of reaction region), and the burner may have a simple structure and may be provided to be inclined in the central region of the top of the gasifier.

When the gasifier and the burner, which are proposed in the present invention, are used, a carbon conversion rate of about 80-95% or 95% or higher can be obtained by a one-cycle reaction before recycling of the reacted particles. After this carbon conversion rate was reached, ash having an unconverted carbon content of about 20-60% depending on the kind of raw material coal may, if necessary, be recycled into the gasifier to obtain a carbon conversion rate of 99% or higher. In addition, unconverted carbon-containing ash is in a dry particle state, and thus if a pulverized coal combustion system is present inside or around the gasification plant, the dry ash particles may be mixed with pulverized coal, which is a raw material for the combustion system, and may be completely burned, thereby increasing energy efficiency. In some cases, the dry ash particles may also be used as a component for producing low-grade fuel.

A suitable operating temperature for embodying a non-slagging type gasification system is preferably selected to be slightly lower than the fusion temperature of ash contained in coal.

In the technology of the present invention, the gasifier is configured to have the following differences so that pulverized coal and an oxidizer are suitably mixed with each other and, at the same time, the flow of pulverized coal particles are directed to the central region of the gasifier so that the gasification reaction is completed while all ash remains in a non-molten state or a partial molten state.

The key element of the coal gasification system for achieving the above-described effects is a burner. Specifically, the burner in the coal gasification system of the present invention comprises: a pulverized coal injection nozzle provided in the center of the burner; a plurality of holes formed around the injection nozzle and serving to supply a primary oxidizer; and a plurality of additional holes formed outside the primary oxidizer supply holes and serving to supply a secondary oxidizer. This burner makes it possible to control the ratio of the amount of the primary oxidizer to the amount of the secondary oxidizer to control the degree of mixing of pulverized coal and the oxidizer and enables to control the flow path of pulverized coal. The gasifier of the present invention is configured such that sufficient conversion of organic materials is achieved in the gasification reactor while the contact of ash with the wall of the gasifier is minimized. Particularly, the present invention provides a gasifier for treating ash in a non-molten or partially molten state.

Although the present invention has been described with reference to specific embodiments, these embodiments are for illustrative purposes only and are not intended to limit the scope of the present invention. Those skilled in the art will appreciate that the described embodiments can be changed or modified without departing from the scope of the present invention. The elements described in the specification may be replaced with various known elements and may be embodied separately or in combination. Accordingly, the scope of the present invention should be determined not by the illustrated embodiments, but by the appended claims and the equivalents thereof.

The invention claimed is:

1. A non-melt and partial melt type entrained-bed cylindrical gasifier to which pulverized coal as a raw material and an oxidizer are supplied through one or more burners disposed at the top of the gasifier,
   wherein each of the burners is composed of a quad tube and comprises:
   a raw material supply line that is the most central region of the burner, through which the pulverized coal is injected into the gasifier by a carrier gas;
   a primary oxidizer region that is an annular region provided around the raw material supply line and having formed therein a plurality of primary oxidizer supply holes located at the lower end of the burner through which a primary oxidizer is injected into the gasifier so that the primary oxidizer induces the pulverized coal to move to the central region of the gasifier;
   a secondary oxidizer region that is an annular region provided around the primary oxidizer region having formed therein a plurality of secondary oxidizer supply holes located at the lower end of the burner through which a secondary oxidizer is injected into the gasifier; and
   a cooling water region which is the outermost annular region provided around the secondary oxidizer region and through which cooling water is introduced into the gasifier and discharged from the gasifier,
   wherein, when the pulverized coal is high-rank coal having poor reactivity, the oxidizer is injected at an angle of 0° to +20° and consists of the primary oxidizer, and when the pulverized coal is low-rank coal having good reactivity, the oxidizer is injected at an angle of −20° to 0° and consists of the primary oxidizer and the secondary oxidize.

2. The non-melt and partial melt type entrained-bed cylindrical gasifier of claim 1,
   wherein, in view of the degree of reactivity of the pulverized coal and a movement direction of the pulverized coal particles, the secondary oxidizer is a supplied in an amount of 0-50% based on a total amount of oxidizers supplied.

3. The non-melt and partial melt type entrained-bed cylindrical gasifier of claim 2, wherein, the ratio between the primary oxidizer and the secondary oxidizer, which are injected, is controlled such that gasification of the pulverized coal occurs relatively slowly compared to when only the primary oxidizer is supplied.

4. The non-melt and partial melt type entrained-bed cylindrical gasifier of claim 2, wherein the number of the secondary oxidizer supply holes is 2-3 times larger than that of the primary oxidizer supply holes, and the diameter of the secondary oxidizer supply holes is ½-⅓ of that of the primary oxidizer supply holes.

5. The non-melt and partial melt type entrained-bed cylindrical gasifier of claim 2, wherein a reaction region of the gasifier has an aspect ratio (L/D) of 5-10, wherein L and D are the length and diameter of the reaction region, respectively.

6. The non-melt and partial melt type entrained-bed cylindrical gasifier of claim 1, wherein a reaction region of the gasifier has an aspect ratio (L/D) of 5-10, wherein L and D are the length and diameter of the reaction region, respectively.

7. The non-melt and partial melt type entrained-bed cylindrical gasifier of claim 1, wherein at least one end of the raw material supply line is formed to be opened to inject the pulverized coal.

* * * * *